UNITED STATES PATENT OFFICE.

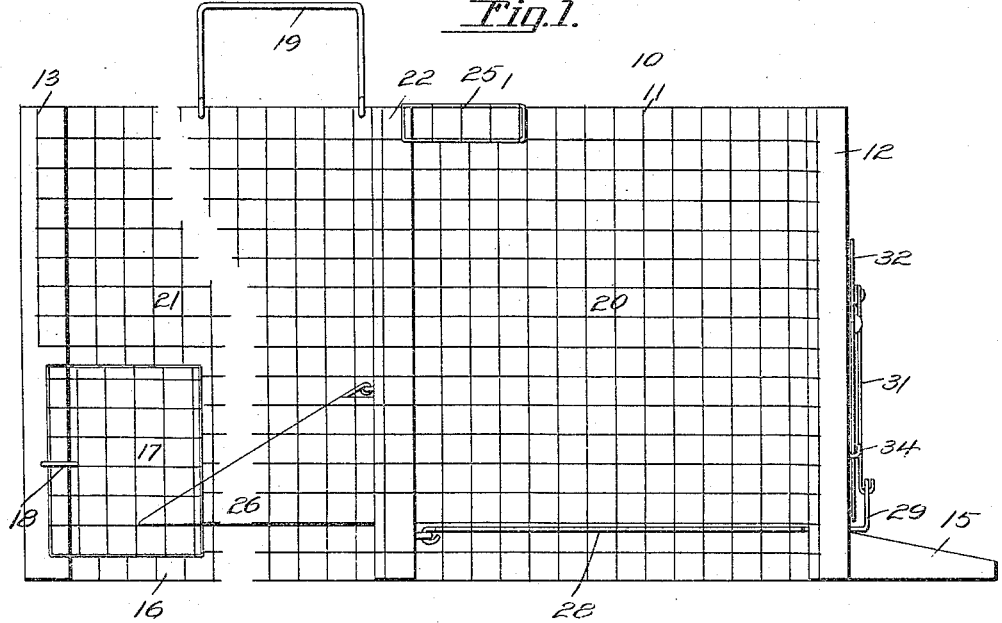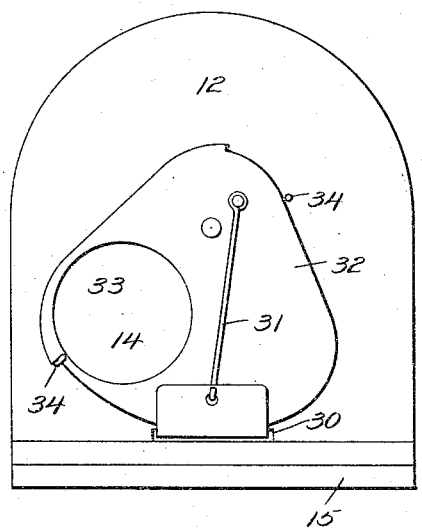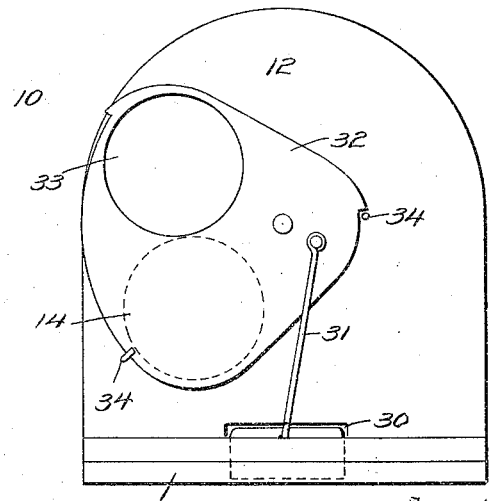

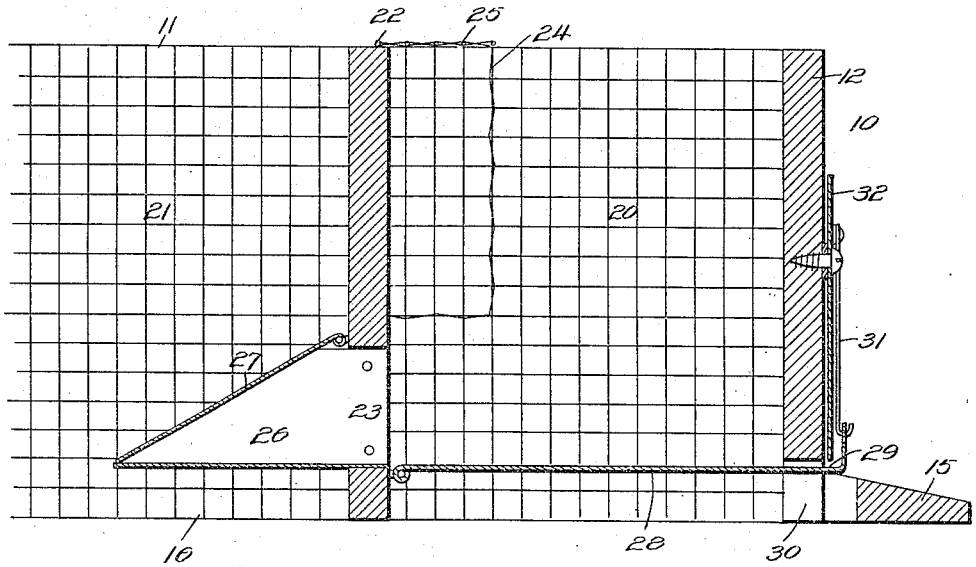
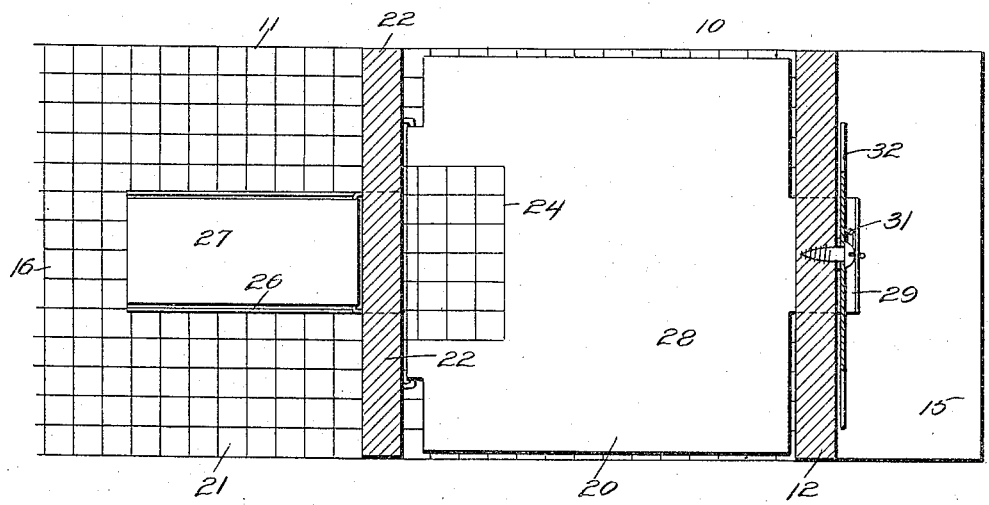

HENRY THOMAS COWAN, OF MOUNT VERNON, INDIANA.

TRAP.

1,176,815.  Specification of Letters Patent.  Patented Mar. 28, 1916.

Application filed June 7, 1915. Serial No. 32,692.

*To all whom it may concern:*

Be it known that I, HENRY T. COWAN, a citizen of the United States, residing at Mount Vernon, in the county of Posey and State of Indiana, have invented new and useful Improvements in Traps, of which the following is a specification.

An object of the invention is to provide a trap particularly adapted for use in catching rats and other similar rodents.

The invention contemplates, among other features, the provision of a trap which normally presents an entrance so that the rodent can readily enter the trap, said entrance being closed by the weight of the rodent upon a movable member coöperating with a closure for the entrance.

Still further embodiments of the invention reside in a trap preferably partitioned to form a plurality of compartments so that after one rodent has been caught and is advanced from one compartment to the other and the trap is reset the first compartment will be ready to receive another one of the rodents, the trap being of a self-setting nature, as will be hereinafter more fully disclosed.

In the further disclosure of the invention reference is to be had to the accompanying drawings, constituting a part of this specification, in which similar characters of reference denote corresponding parts in all the views, and in which:

Figure 1 is a side elevation of the trap; Fig. 2 is a front elevation, the entrance being open; Fig. 3 is a similar view with the entrance closed; Fig. 4 is a vertical longitudinal sectional view taken through the trap; and Fig. 5 is a horizontal sectional view taken through the trap, showing the manner of hinging the movable closure-actuating member.

Referring more particularly to the views, the trap 10 consists of a wire-like body or frame 11 forming the side walls and top of the trap, said frame being provided with front and rear ends 12 and 13, with the front end having an opening or entrance 14 and also including a forwardly inclined platform 15. The bottom of the trap is also preferably constructed of wire as indicated by the numeral 16, a suitable door 17 being hinged upon a side of the frame 11 for removing the captured rodents from the trap, with the door normally secured by a suitable catch 18. A hand-hold or grip 19 is connected with the frame 11 on its top at substantially the medial portion of the trap so as to permit of carrying the trap from one place to another.

The trap is provided into front and rear compartments 20 and 21, respectively, by means of a partition 22 provided with an opening 23 and secured to the partition 22 is a bait holder 24 lying within the compartment 20, said bait holder having its upper end open, with a door 25 mounted to swing upon the upper part of the frame and normally closing the bait holder, said door being provided to permit of ready access to the bait holder for depositing the bait therein. The bait holder, furthermore, is preferably arranged immediately above the opening 23 in the partition 22, as will be readily seen by referring to the views. A gangway 26 projects rearwardly from the partition 22 to extend into the rear compartment 21, said gangway being provided for the opening 23 and preferably having the edges of its sides inclined to gravitationally support a swinging door 27 and which normally closes the outer end of the gangway.

Mounted to swing in the front compartment 20 is a flat plate like operating member 28 having its forward end terminating in a forwardly extending tongue 29 passing through a small opening 30 in the lower part of the front end 12, said opening being continued to the platform 15, with the free end of the tongue, after passing through the opening, bent upwardly and having a vertical rod 32 pivoted thereto. Mounted to swing upon the front end 12 is a substantially semi-circular closure 32 having a circular opening 33 adapted to register with the opening 14, the upper end of the rod 31 being eccentrically pivoted to the closure 32 with respect to the pivotal support of the closure upon the front end. Stop members 34 are arranged upon the front end, with one of said stop members adapted to limit the swinging movement of the closure when the same swings to have its opening 30 register with the opening 14, whereas the other stop member is adapted to be engaged by the closure when the same has been swung so that the solid portion of the closure will close the opening 14, it being readily understood that the closure and operating member 28 are so proportionately constructed as to size and weight that the closure 32 will normally be in a position whereby its opening 33 will be in registration with the opening 14.

Now when a rodent enters the front compartment by passing through the registering openings 14 and 32 the weight of the rodent upon the platform or operating member 28 causes the same to swing downwardly, thus swinging the closure 32 so that its solid portion will close the opening 14 in the front. The rodent, seeing that it cannot get out through the opening through which it passed into the front compartment, will pass rearwardly and endeavor to escape through the gangway and which has its closure swinging in the direction the gangway extends so that the rodent can readily pass through the gangway into the second or rear compartment 21, after which the door 27 will gravitate into a closed position to prevent the rodent from reëntering the first or front compartment. At the moment the rodent passes into the second compartment, thus removing its weight from the operating member or platform 28, the closure 32 will swing so that the opening 33 thereof will again register with the opening 14 and the trap is then ready to receive another one of the rodents and to be operated in substantially the same manner as set forth.

From the foregoing description it will be readily seen that the trap described is of a simple construction, will effectually operate when a weight is disposed upon its movable operating member and will be of a self-setting nature in that it will be closed by the weight of the rodent after the rodent has entered the trap and remains in the first compartment, and will open when the rodent leaves the first compartment and passes into the second compartment so that the trap, after the rodent has passed into the second compartment, will be again ready to catch another one of the animals.

Having thus described my invention, I claim:

1. A rat trap comprising a frame providing a compartment, a front for the compartment and having an opening and a slot, a platform projecting from the front and slotted, an operating member mounted to swing in the compartment, a swinging closure on the front provided with an opening normally registering with the opening in the front, a tongue projecting forwardly from the operating member to pass through the slots in the front and platform, and a rod eccentrically pivoted on the swinging closure and connected with the tongue whereby said closure will be operated to close an opening in the front when a weight is deposited on the operating member.

2. A rat trap comprising a frame providing a compartment, a front for the compartment having an opening and a slot, a platform projecting from the front and slotted, an operating member mounted to swing in the compartment, a swinging closure on the front provided with an opening normally registering with the opening in the front, a tongue projecting forwardly from the operating member to pass through the slots in the front and platform, a rod eccentrically pivoted on the swinging closure and connected with the tongue whereby said closure will be operated to close an opening in the front when a weight is deposited on the operating member, and stop members projecting from the front to be engaged by the closure to limit its swinging movement.

3. A rat trap comprising a frame providing a compartment, a front for the compartment having an opening and a slot, an operating member mounted to swing in the compartment, a closure eccentrically mounted on the front provided with an opening normally registering with the opening in the front, a tongue formed contiguous with and projecting forwardly from the operating member and passing through the slot in the front, a rod eccentrically pivoted on the swinging closure and connected with the tongue and disposed exteriorly of the trap whereby said closure will be operated to close the opening in the front when a weight is deposited on the operating member, and stop members projecting from the front to be engaged by the closure to limit its swinging movement.

In testimony whereof I affix my signature in presence of two witnesses.

HENRY THOMAS COWAN.

Witnesses:
JOHN W. HALL,
JOHN R. RANES.